United States Patent [19]
Hockert et al.

[11] Patent Number: 4,634,220
[45] Date of Patent: Jan. 6, 1987

[54] DIRECTIONALLY IMAGED SHEETING

[75] Inventors: Eric N. Hockert, Cottage Grove; Bruce D. Orensteen, St. Paul; Thomas I. Bradshaw, Afton; Frank A. Borgeson, St. Paul Park, all of Minn.

[73] Assignee: Minnesota Mining and Manufacturing Company, St. Paul, Minn.

[21] Appl. No.: 464,627

[22] Filed: Feb. 7, 1983

[51] Int. Cl.[4] ............................................. G20B 27/00
[52] U.S. Cl. .................................................. 350/167
[58] Field of Search ................... 40/582, 615; 350/103, 350/105, 167, 416; 346/76 L

[56] References Cited

U.S. PATENT DOCUMENTS

| | | | |
|---|---|---|---|
| 1,918,705 | 7/1933 | Ives | 350/131 |
| 2,140,702 | 12/1938 | Kanolt | 350/131 |
| 2,151,301 | 3/1939 | Percy et al. | 350/131 |
| 2,495,697 | 1/1950 | Chilowsky | 350/167 UX |
| 3,154,872 | 11/1964 | Nordgren | 40/135 |
| 3,503,315 | 3/1970 | De Montebello | 95/18 |
| 3,801,183 | 4/1974 | Sevelin et al. | 350/105 |
| 4,082,426 | 4/1978 | Brown | 350/105 |
| 4,099,838 | 7/1978 | Cook et al. | 350/105 |
| 4,200,875 | 4/1980 | Galanos | 346/1.1 |

Primary Examiner—John K. Corbin
Assistant Examiner—Vincent J. Lemmo
Attorney, Agent, or Firm—Donald M. Sell; James A. Smith; Roger R. Tamte

[57] ABSTRACT

Sheeting having images that are viewable within limited angles of viewing from the front of the sheeting are prepared from retroreflective sheeting or from sheeting patterned after retroreflective sheeting, i.e., sheeting having a monolayer of microlenses like the monolayer of microspheres in retroreflective sheeting. A layer of transparent material covers the back surface of the microlenses. Axial markings are disposed behind individual microlenses at the back of the layer of transparent material and the markings are viewable from the front of the sheeting as an image.

45 Claims, 7 Drawing Figures

DIRECTIONALLY IMAGED SHEETING

FIELD OF THE INVENTION

The present invention provides new forms of directionally imaged sheeting, i.e., sheeting that has been provided with images that are viewable within limited angles of viewing. The invention also provides novel methods for preparing the new sheeting involving controlled laser irradiation of certain forms of retroreflective sheeting, or of other forms of sheeting patterned after retroreflective sheeting ("retroreflective" sheeting reflects light back toward the source of the light, irrespective of the angle at which the light is incident on the sheeting, within rather wide ranges of incident angles).

BACKGROUND OF THE INVENTION

Retroreflective sheeting in which a graphic image or other mark is built into the sheeting has found a number of important uses, particularly as distinctive labels useful to authenticate an article or document. For example, retroreflective sheetings in which legends are printed into the sheeting, as taught in U.S. Pat. Nos. 3,154,872; 3,801,183; 4,082,426; and 4,099,838, have found use as validation stickers for vehicle license plates and as security films for driver's licenses, government documents, phonograph records, tape cassettes, and the like.

Galanos, U.S. Pat. No. 4,200,875, teaches a different form of imaged retroreflective sheeting, particularly a "high-gain retroreflective sheeting of the exposed-lens type" in which images are formed by laser irradiation of the sheeting through a mask or pattern. The noted "high-gain" sheeting comprises a plurality of transparent glass microspheres partially embedded in a binder layer and partially exposed above the binder layer, with a metal reflective layer coated on the embedded surface of each of the plurality of microspheres, and with the binder layer containing carbon black to minimize any stray light that impinges on the sheeting. The patent teaches that images formed in such sheeting by laser irradiation can be viewed if, and only if, the sheeting is viewed from the same angle at which the laser irradiation was directed at the sheeting.

The Galanos patent does not explain how an image is formed in the described retroreflective sheeting other than to state that the image is formed by "structural alterations (i.e., modifications)" of the sheeting. Based on our work using conditions assumed to be like those used by Galanos on high-gain sheeting, a likely explanation for the image formation observed by Galanos is a modification of the glass microspheres, e.g., by a localized devitrification, melting, or erosion of the glass at the back edges of the microspheres where the laser beam is focused.

Some advantages of the imaged sheeting taught in the Galanos patent are that the images are seen within sharply defined angular ranges, which could be used as an identifying characteristic to help assure that the sheeting is authentic; and the images can be formed in an already manufactured retroreflective sheeting, thereby avoiding the need for inventories of specially printed retroreflective sheeting and avoiding the need for long process runs to distribute the costs in setting up a printing operation.

However, the imaged sheeting taught in the Galanos patent also has important disadvantages which limit its utility. For example, it provides only black and white images. Also, the imaged sheeting is not useful to provide retroreflective images in outdoor environments where it may receive precipitation, because such precipitation can alter the optical relationships in the sheeting and obliterate or greatly reduce a retroreflective image.

SUMMARY OF THE INVENTION

The present invention provides a new and unique directionally imaged sheeting which has a number of important advantages and uses, including the potential for images that are colored other than black or white, the capability in retroreflective versions to retroreflect whether wet or dry, and the potential for transparency so that the sheeting may be used as an overlay film, e.g., to authenticate documents, driver's licenses, and the like. Briefly, this new sheeting comprises a monolayer of transparent microlenses; a layer of transparent material covering the back surfaces of the microlenses; and at least one set of axial markings on the back surface of the layer of transparent material ("axial markings" are defined as visibly distinctive structures of limited area, such as coated spots, openings in otherwise continuous layers, or deformities in a layer, there being an individual marking for each microlens in the image area, with the center point for each such individual marking being located on an axis that extends through the optical center of its associated microlens, and with the individual axes intersecting at a common viewing point or line, or being essentially parallel to one another; the axial markings are together viewable from the front of the sheeting as an image, with the image being seen within a limited conical range of viewing angles centered on a line parallel to the stated individual axes.)

Sheeting of the invention can be prepared through the use of laser irradiation, typically on retroreflective sheeting, but on a different kind of retroreflective sheeting from that used by Galanos. As in the sheeting used by Galanos, the retroreflective sheeting used in the invention includes a monolayer of microspheres (which serve as the microlenses mentioned above), and a specularly reflective layer disposed behind the microspheres. But in contrast to the sheeting used by Galanos, the sheeting includes a layer of transparent polymeric material, known as a "spacing layer," disposed between the back surfaces of the microspheres and the specularly reflective layer. The separation of the microspheres and specularly reflective layer by the spacing layer positions the specularly reflective layer at approximately the focal point for light rays passing through the microspheres. In addition, the sheeting typically includes one or more layers of transparent polymeric material covering the front surfaces of the microspheres, and because of these layers, the sheeting is commonly known as "enclosed-lens" or "embedded-lens" retroreflective sheeting.

It has been found that laser radiation directed at embedded-lens retroreflective sheeting is transmitted through the sheeting, without apparent modification of the glass microspheres as in Galanos, and forms axial openings in the specularly reflective layer, e.g., by the melting, retracting, or vaporization of the portion of the specularly reflective layer on which the laser radiation is focused. These openings or markings are useful in themselves to define an image, but in addition they may be used to form images having additional distinctive characteristics, e.g., by impregnating a colored coating composition through the openings. The specularly reflective layer in effect serves as a mask, and unique optical effects can be achieved through the use of this mask.

While enclosed- or embedded-lens retroreflective sheeting is the most readily used sheeting for imaging according to the invention, other sheetings modeled after such sheeting may also be used, i.e., having the characteristics summarized above of a monolayer of microlenses (see, for example, the lenticular sheeting taught in U.S. Pat. No. 3,503,315); a layer of transparent polymeric material covering the back surfaces of the microlenses; and a thin laser-penetrable masking layer coated on the back surface of the polymeric layer. Following irradiation, many alternative steps may be taken, generally using the thin layer as a mask to form distinctive markings centered on the openings.

The laser radiation may be patterned, e.g., by passage through a mask, so as to form openings behind only a selected portion of the microlenses, or it may be applied uniformly over the whole surface of the sheeting. Sheeting of the invention is regarded as "imaged" herein whether it is prepared with patterned or with whole-surface radiation, since in either case the sheeting has a visibly distinctive appearance at certain angles of viewing. The images are generally viewable in diffuse light, but the brightest images are usually seen under retroreflective viewing conditions (i.e., viewing from near an axis of light beamed at the sheeting under darkened conditions) or, in some embodiments, by light beamed at the rear of the sheeting and transmitted through the sheeting.

DETAILED DESCRIPTION

Figure 1:
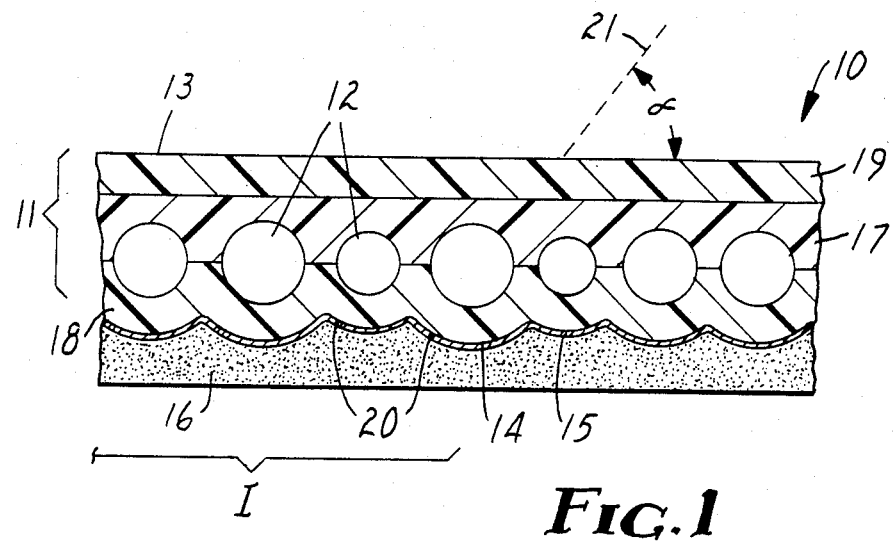
FIGS. 1 and 3 to 5 are cross-sectional views through illustrative embodiments of sheeting of the invention.

FIG. 1 shows an illustrative directionally imaged embedded-lens retroreflective sheeting of the invention. This illustrative sheeting 10 comprises a transparent polymeric sheet 11; a monolayer of transparent microspheres 12 embedded in the transparent polymeric sheet intermediate its front surface 13 and back surface 14; a thin specularly reflective layer 15, for example, a layer of vapor-deposited aluminum or chemically deposited silver, coated on the back surface 14 of the transparent polymeric sheet 11; and a layer 16, which typically is an adhesive layer by which the sheeting can be adhered to a substrate, and which underlies and protects the specularly reflective layer. The illustrative transparent polymeric sheet 11 comprises a layer 17 in which the front portions of the microspheres are embedded; a spacing layer 18, which covers the back surfaces of the microspheres and is contoured so as to generally follow the curved back surfaces of the microspheres; and a top layer 19 which is optionally included for reasons such as to improve the weatherability of the sheeting, resistance to scratching, etc.

The specularly reflective layer 15 contains small axial openings 20 behind a selected portion I of the microspheres 12, formed by displacement of material from the layer 15. The axial openings are at common locations on the curved surfaces in back of each microsphere, on axis with light rays incident on the sheeting at the angle alpha ($\alpha$); for simplicity of illustration, refraction of light is disregarded in drawing the axis line 21 and angle $\alpha$. When the sheeting is viewed from the front at the angle, or along the line 21, under either ambient or transmitted light or retroreflective viewing conditions, the openings are in the line of sight through the microspheres. The openings are seen together and combine to define a distinctive pattern or image I.

Even when viewed in ambient light, the appearance of the sheeting at the angle $\alpha$ is largely a retroreflective effect. The portion of ambient light impinging on the sheeting from over the shoulder of an observer is retroreflected by the sheeting except that retroreflection is reduced in the area I where there are openings in the specularly reflective layer. The reduced reflection is seen as a dark image in contrast to the brightness of the retroreflective sheeting at other angles or in the background areas. At most angles of viewing and in background areas at the viewing angle $\alpha$, the sheeting 10 will have a whitish appearance in diffuse light or a bright appearance under retroreflective viewing conditions; or, if a transparent pigment or dye is contained in any of the layers 17, 18 or 19, the color provided by the pigment or dye. But at angles near or at the angle $\alpha$, the image area I of the sheeting 10 where axial openings 20 have been formed will have a darker appearance.

The range of angles at which the sheeting 10 or image area I has a darkened appearance depends upon the diameter of the axial openings 20. Typically, openings on the order of 3–5 micrometers in diameter are used with typical microsphere sizes, i.e., 50–100 micrometers; but openings of different size can also be obtained to provide a different range of angles. Also, although the openings are often roughly circular, they can have elongated or other shapes obtained, for example, by rotating a beam of laser radiation through a range of incidence angles such that each imaged microsphere is irradiated by two or more pulses at slightly different angles to produce openings formed from overlapping smaller openings. Such elongated or other shaped openings may be regarded as a series of axial openings.

Figure 2:
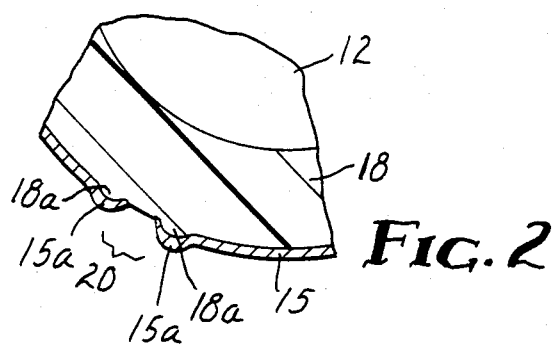
FIG. 2 is an enlarged view of a portion of an illustrative sheeting of the invention.

FIG. 2 shows an enlarged sectional view of an axial opening 20 as it is understood to be typically formed by laser radiation. As seen, a slight ridge 18a appears to be formed in the polymeric material of the spacing layer 18 around the periphery of the opening, apparently through melting of the polymeric material. Also, the material of the specularly reflecting layer 15 is removed and a slight ridge 15a of the material exists around the opening, suggesting that some of the material of the layer where the opening now exists may have retracted following melting of the material.

Figure 3:
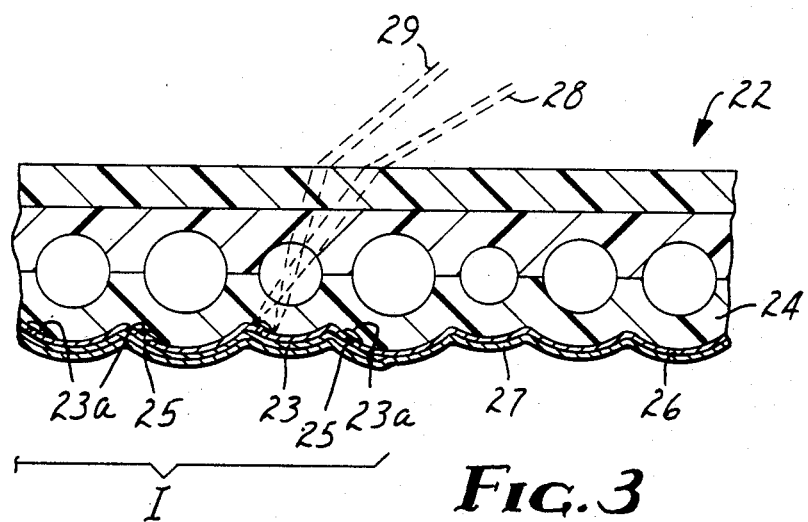

FIG. 3 shows another embodiment of the invention in which a sheet like that described in FIG. 1 has been modified to introduce color into the image formed in the sheeting. Specifically, in the sheeting 22 shown in FIG. 3, a colored coating material 23 has been coated onto the specularly reflective layer and has impregnated into the spacing layer 24 in areas 23a surrounding the axial openings 25 in the specularly reflective layer 26. Alternatively, the colored coating material can penetrate between the spacing layer 24 and the specularly reflective layer 26, or may simply fill the openings 25. Other effects are obtained by first using an ink that impregnates into the spacing layer (e.g., because it is soluble in or compatible with the spacing layer) followed by coating of a non-impregnating ink. A second specularly reflective layer 27 is coated over the first specularly reflective layer 26 to provide retroreflection even when the angle of viewing is exactly on axis with the axial openings 25.

When the sheeting 22 is viewed from the front at a range of angles between the lines 28 and 29, the sheeting has a colored appearance in the area I to which the colored coating material 23 has been applied. (If colored coating material just fills the opening 25, the range of viewing angles is very narrow.) The color is brightest under retroreflective viewing conditions, when a light source is beamed at the sheeting and retroreflected by the specularly reflective layer behind the colored areas 23a; but the color is also visible in diffuse light (when, as discussed above, more mild retroreflective effects occur). When viewed on axis with openings 25, there could be little or no color from the coating compositions seen if the specularly reflective layer 27 were not present (in which case the image I would simply have the color black, i.e., a darkened appearance); but the presence of the layer 27 causes light to be retroreflected throughout the whole range of viewing points between the lines 28 and 29.

A wide range of organic-solvent-based inks or other coating materials are useful as an impregnating coating composition with organic-based layers 24. The amount of migration, and therefore the breadth of the range of angles between the lines 28 and 29, can be controlled by controlling the viscosity of the coating material; by removing the layer 23, e.g., by wiping, after a period of time during which the coating material migrates through the opening 25; by repeating application of the coating composition; by use of heat; etc.

Figure 4:
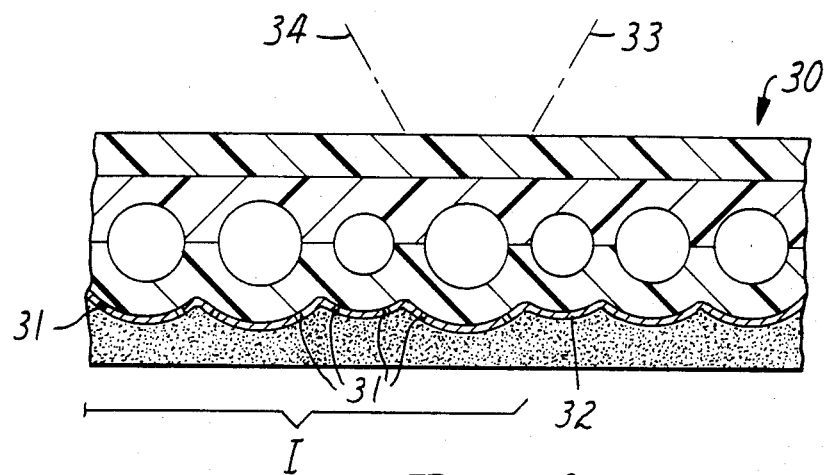

FIG. 4 shows a different sheeting 30 of the invention in which there are two axial openings 31 in the specularly reflective layer 32 behind each of a selected group I of microspheres. Such openings are formed by exposing the sheeting 30 to laser irradiation in a pattern or through a mask at two different angles. At most angles of viewing the sheeting 30 has a whitish appearance provided by the specularly reflective layer or a colored appearance provided by a transparent pigment or dye within the sheeting, but at angles centering on the lines 33 and 34 the sheeting has a darkened appearance (or black color) in the image area.

Figure 5:
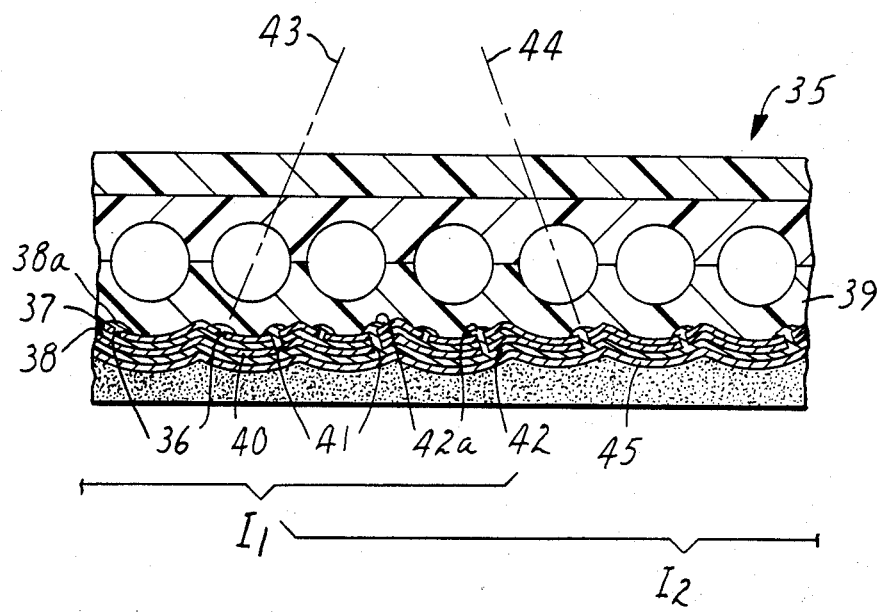

FIG. 5 illustrates another embodiment of sheeting of the invention which provides a plurality of images colored different colors. The illustrated sheeting 35 has a first image $I_1$, provided by a first set of axial openings 36 in a first specularly reflective layer 37, and by a coloring composition 38 which has penetrated into the spacing layer 39 in the areas 38a around the openings 36. A second specularly reflective layer 40 is coated over the first layer and the layer of coloring composition 38. A second image $I_2$ is formed in the sheeting by irradiation at an angle different from that which formed the openings 36. The second irradiation forms a set of axial openings 41 extending through the first specularly reflective layer 37, the layer of coloring composition 38, and the second specularly reflective layer 40. A second layer of coloring composition 42 is coated on the second specularly reflective layer and penetrates through the openings 41 into the areas 42a after which a third specularly reflective layer 45 is coated over the layer 42. When viewed along the line 43, the sheeting displays an image $I_1$ colored by the coloring composition 38, and when viewed along the line 44, the sheeting displays a different image $I_2$ colored by the coloring composition 42.

Multicolored images may also be formed by printing a multicolored image on a sheeting as shown in FIG. 1, whereupon different colors in the image layer penetrate different openings in the specularly reflective layer. Also, preformed colored layers may be adhered to the specularly reflective layer. Similarly a photographic emulsion can be coated onto the specularly reflective layer, or a preformed photographic emulsion can be adhered to the specularly reflective layer with a layer of transparent adhesive. When the assembly is exposed to light, generally through a transparency, the emulsion is exposed through the axial openings, and the emulsion can then be developed to form images viewable through the axial openings.

Although a thin laser-penetrable masking layer is typically used in forming images in sheeting of the invention, the layer need not be retained in all embodiments of the invention after the imaging operation is completed. For example, after a colored coating composition has been applied through axial openings in the masking layer, the masking layer may be removed, e.g., with etching solutions that do not remove the markings formed with coating compositions applied through the masking layer. A transparent sheeting can thus be formed, which is useful as an overlay film.

Also, the specularly reflective layer in sheeting of the invention need not be thin but can be a rather thick layer such as an aluminum foil. In such a product laser radiation forms recesses or other deformities in the foil which are visible as a darkened image at angles of viewing in line with the pitted openings.

The transparent polymeric materials in sheeting of the invention may be any of a variety of materials, such as alkyd, acrylic, vinyl, polyester, or polyurethane. Many such resins have been used in retroreflective sheeting, and can be used in sheeting of the invention. The laser-penetrable masking layer is typically vapor-deposited aluminum on the order of 500–1000 angstroms thick, but also could be vapor-deposited from other materials such as copper or silver, or formed by other techniques, such as chemical deposition (e.g., of silver) or sputtering (e.g., nickel or chromium). Black masking layers can be formed by vapor-depositing aluminum oxide coatings by known procedures. When a black or non-reflective masking layer is incorporated into sheeting of the invention, the sheeting will have a dark appearance except in the image areas at the viewing angles where it may have a brighter appearance, especially if a specularly reflective layer is applied over the axial openings in the black masking layer.

The invention will be further illustrated by the following examples.

EXAMPLE 1

Retroreflective sheeting as shown in FIG. 1 (specifically "Scotchlite" Brand Engineer Grade No. 3290 Reflective Sheeting supplied by Minnesota Mining and Manufacturing Company), which was complete except for absence of adhesive and release liner, was irradiated on the front of the sheeting using a Q-switched neodymium-doped yttrium-aluminum-garnet laser operated at a pulse repetition rate of 3.4 kilohertz, 7 watts average power, to provide a nominally collimated 3-millimeter-diameter beam. The beam was perpendicular to the sheeting, and the sheeting was moved under the beam in a raster pattern, moving at a rate of 100 inches (254 centimeters) per minute in the X direction, and being stepped 1.5 millimeters in the Y direction at the end of each X direction scan. The pulse length was between 200 and 400 nanoseconds, and at the described rate of movement each pulse overlapped by about 98 percent areas which had been irradiated by a previous pulse.

After completion of this operation, the sheeting was viewed in diffuse or ambient light as well as under retroreflective viewing conditions from a variety of angles. The sheeting was generally whitish in appearance in diffuse light, and was brightly reflective under retroreflective viewing conditions, but it had a black coloration either in diffuse light or under retroreflective viewing conditions when viewed on a line perpendicular to the sheeting, i.e., the angle at which the sheeting was irradiated by the laser beam.

The back vapor-coated aluminum surface of the sheeting was viewed under a microscope, and openings in the vapor-coated aluminum layer about 3 to 5 micrometers in diameter were observed behind each microsphere. The openings were disposed on the optical axes of the microspheres perpendicular to the front face of the sheeting, that is, on axis with the laser beam, and at the approximate focal points for the portions of the laser beam transmitted by each microsphere.

The irradiated sheeting was marked on its back vapor-coated surface in selected areas with marking pens containing different colored inks (3M Brand Permanent Transparency Marking Pen Nos. 00-0015-0299-6 (red), 0387-9 (blue), 0388-7 (green), and 0389-5 (purple)). When viewed from the front along a line perpendicular to the sheeting, the sheeting continued to appear generally black, with only a slight coloration in the areas where it had been marked. However, when viewed along a line slightly displaced from a perpendicular line, the sheeting was colored in the areas that had been marked and had a bright colored retroreflection. Specifically, the sheeting was black through a range of angles about 8° on either side of a line perpendicular to the sheeting, and the colored ink-formed image was visible when viewed at an angle of about 8° through 12° from the perpendicular line.

The aluminum vapor-coated layer was then etched away from the sheeting using a mild sodium hydroxide solution. The polymeric material revealed after removal of the vapor-coated layer did not appear to have been significantly disturbed except that slight circular ridges were detected that appeared to coincide with the edges of the openings that had been formed in the vapor-coated layer. In the areas that had been marked with a pen, ink was seen to have diffused into the polymeric material which had supported the vapor-coated layer in areas surrounding the openings in the vapor-coated layer. The diameter of the area of ink diffusion was approximately twice the diameter of the opening that had existed in the vapor-coated layer. Polymeric material was removed to allow inspection of the glass microspheres, but no damage to the microspheres was detected.

EXAMPLE 2

Figure 6:
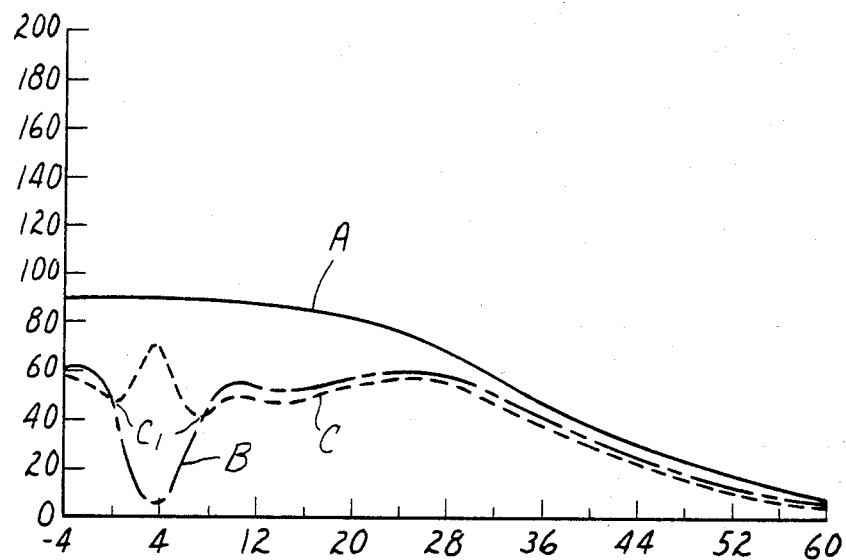
FIG. 6 is a graph of the results of retroreflectivity measurements on an illustrative retroreflective sheeting of the invention.
Figure 7:
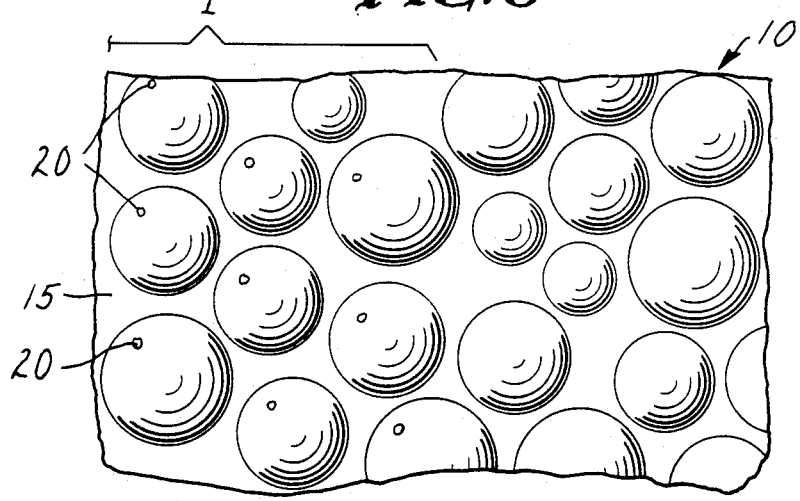
FIG. 7 is a bottom view of sheeting as shown in FIG. 1 with the layer 16 removed.

Example 1 was repeated except that the samples were not marked with a marking pen and a layer of aluminum was vapor-coated onto the back surface of the sheeting after the sheeting had been irradiated. The retroreflectivity of the sheeting at various stages of the processing was measured in a retroluminometer (as described in Defensive Publication No. T987,003) and the results are shown in FIG. 6 of the drawing. Curve A in FIG. 6 shows the retroreflectivity obtained from the sheeting prior to irradiation; Curve B shows the results obtained after irradiation; and Curve C shows the results after the sample had again been vapor-coated. As may be seen, the sheeting recovers substantially its full reflectivity except over the areas $C_1$ of Curve C, indicating that the microspheres and basic structure of the sheeting were functionally intact, i.e., they transmitted light substantially uniformly through the full range of viewing angles for the sheeting. However, the slight ridge of polymeric material formed around the opening in the vapor-coat and/or deformation of the vapor-coat reduces retroreflectivity to somewhat less than optimum in the area of the ridge.

EXAMPLE 3

Example 1 was repeated except that the sheeting was exposed to irradiation four different times at different angles of irradiation. Specifically, the laser beam was directed at the sheeting at an angle 30° from normal and at rotational angles of 0°, 90°, 180° and 270°. When the back surface of the irradiated sheeting was viewed under a microscope, four openings were found for each microsphere. The openings were about 3 to 5 micrometers in diameter and were located on the optical axes of the microspheres, i.e., on lines passing through the centers of the microspheres, at an angle approximately 30° from a line perpendicular to the sheeting and at rotational angles of 0°, 90°, 180° and 270°. When the front of the sheeting was viewed in diffuse light at most angles, the sheeting was generally whitish in appearance. However, when viewed from any of the angles at which the sheeting had been irradiated, the sheeting was significantly darker.

Colored coating material was applied to the back of the sheeting with marking pens in the manner described in Example 1, whereupon the sheeting was colored when viewed at angles slightly removed from the angles of irradiation in the manner described in Example 1. The marked sheeting was vapor-coated a second time on the back surface, and when viewed from the front, the sheeting was brightly colored at the angles of irradiation plus or minus 12°.

EXAMPLE 4

Example 1 was repeated except that the sheeting irradiated was a complete sheeting having a layer of adhesive on the back surface and a release liner covering the adhesive layer. After irradiation, the sheeting had a black or darkened image at the angle of irradiation as described for Example 1 before application of the colored coating material.

EXAMPLE 5

Example 1 was repeated except that the laser beam was scanned across the reflective sheeting in a pattern rather than uniformly across a whole area of the sheeting. Specifically, the beam was scanned to cover areas having the shapes "3" and "M." When the sheeting was viewed from the front after irradiation and tilted at the angle at which the beam had been directed to the sheeting, a significantly darker "3M" appeared on the sheeting surrounded by a background of the normal whitish color of the sheeting.

Similarly, sheeting as described in Example 1 was given an imaged pattern by scanning the laser beam across the sheeting while the sheeting was covered with a mask of white paper from which a "3" and "M" had been cut. After irradiation, a significantly darker "3M" was visible at the angle at which irradiation had been performed.

What is claimed is:

1. Directionally imaged sheeting comprising a monolayer of transparent microlenses; a layer of transparent material covering at least the back surfaces of the microlenses and extending continuously between microlenses; and at least one set of regularly repeated axial markings on the back surface of the layer of transparent material; each individual marking in a set of markings being associated with a microlens, with the center point of each individual marking being located on an axis that extends through the optical center of its associated microlens and is coordinated with the axes of the other markings in the set so that the markings are together viewable as an image from the front of the sheeting across a limited range of angles centered on said coordinated axes.

2. Sheeting of claim 1 in which the markings comprise a marking material coated on limited areas of the back surface of the layer of transparent material.

3. Sheeting of claim 2 in which the marking material is impregnated into the layer of transparent material.

4. Sheeting of claim 1 in which the markings comprise openings formed in a thin layer carried on the back surface of the layer of transparent material.

5. Sheeting of claim 4 in which the markings further comprise marking material coated onto the back surface of the layer of transparent material through the openings in the thin layer.

6. Sheeting of claim 5 in which the marking material penetrates inside the openings in the thin layer and occupies an area larger than the openings.

7. Sheeting of claim 6 in which the marking material is impregnated into the layer of transparent material.

8. Sheeting of claim 4 in which the thin layer comprises a specularly reflective material.

9. Sheeting of claim 4 in which a specularly reflective layer covers the axial openings.

10. Sheeting of claim 4 in which the thin layer is non-reflective, and a specularly reflective layer is disposed over the axial openings.

11. Sheeting of claim 1 which includes at least two sets of axial markings on the back surface of the layer of transparent material viewable at different selected ranges of angles.

12. Sheeting of claim 1 in which the microlenses are microspheres.

13. Sheeting of claim 12 in which the microspheres are embedded in a transparent polymeric sheet intermediate the front and back surfaces of the sheet, and said layer of transparent material forms the back surface of the transparent polymeric sheet.

14. Sheeting of claim 13 in which the back surface of the transparent polymeric sheet is contoured so as to follow the curved back surfaces of the microspheres.

15. Directionally imaged sheeting comprising a monolayer of transparent microlenses which focus light rays to a point spaced behind the back surfaces of the microlenses; a layer of transparent polymeric material covering the back surfaces of the microlenses and having a back surface at the locus of the focal points of the microlenses; and at least one set of regularly repeated axial markings on the back surface of the layer of transparent polymeric material, each individual marking in a set of markings being associated with a microlens, with the center point of each individual marking being located on an axis that extends through the optical center of its associated microlens and is coordinated with the axis of the other markings in the set so that the markings are viewable as an image from the front of the sheeting across a limited range of angles centered on said coordinated axes.

16. Sheeting of claim 15 in which the markings comprise a marking material coated on limited areas of the back surface of the layer of transparent material.

17. Sheeting of claim 15 in which the markings comprise openings formed in a thin layer carried on the back surface of the layer of transparent polymeric material.

18. Sheeting of claim 17 in which the markings further comprise marking material coated onto the back surface of the layer of transparent polymeric material through the openings in the thin layer.

19. Sheeting of claim 17 in which the thin layer comprises a specularly reflective material.

20. Sheeting of claim 17 in which a specularly reflective layer covers the axial openings.

21. Sheeting of claim 15 which includes at least two sets of axial markings on the back surface of the layer of transparent polymeric material viewable at different selected ranges of angles.

22. Directionally imaged sheeting comprising a monolayer of transparent microspheres; a layer of transparent polymeric material which extends over the monolayer of microspheres and covers the back surfaces of the microspheres, and a specularly reflective layer disposed at the back surface of the layer of transparent polymeric material; the specularly reflective layer containing at least a first set of axial recesses which are viewable as an image from the front of the sheeting within a selected range of angles.

23. Directionally imaged sheeting comprising a transparent polymeric sheet; a monolayer of transparent microspheres embedded in the sheet intermediate the front and back surfaces of the sheet, and a thin masking layer coated on the back surface of the polymeric sheet; the masking layer containing at least a first set of regularly repeated axial openings, each individual opening in a set of openings being associated with a microsphere, with the center point of each individual opening being located on an axis that extends through the optical center of its associated microsphere and is coordinated with the axes of the other openings in the set so that the openins are viewable as an image from the front of the sheeting across a limited range of angles centered on said coordinated axes.

24. Sheeting of claim 23 in which the back surface of the polymeric sheet is contoured to follow the back surfaces of the microspheres.

25. Sheeting of claim 23 in which a colored marking material is applied to the back surface of the polymeric sheet through at least some of the axial openings.

26. Sheeting of claim 25 in which the colored marking material is impregnated into the polymeric sheet.

27. Sheeting of claim 25 in which the colored marking material is penetrated between the specularly reflective layer and the polymeric sheet around the axial openings.

28. Sheeting of claim 25 in which a specularly reflective layer is coated over the masking layer and covers at least some of the axial openings.

29. Sheeting of claim 28 in which the masking layer is non-reflective.

30. Sheeting of claim 28 in which the masking layer and specularly reflective layer contain at least one second set of axial openings which are viewable as an image from the front of the sheeting within a selected range of angles different from the first-recited selected range of angles.

31. Sheeting of claim 30 in which a first colored marking material is applied to the back surface of the polymeric sheet thtough at least some of the first set of axial openings, and a second colored marking material is applied to the back surface of the polymeric sheet through at least some of the second set of axial openings.

32. Sheeting of claim 23 in which the masking layer is specularly reflective.

33. Sheeting of claim 23 in which the masking layer is vapor-deposited metal.

34. Sheeting of claim 23 which further includes a continuous layer disposed in back of the masking layer and containing an imagewise pattern in the layer.

35. Sheeting of claim 23 in which the masking layer contains at least one second set of axial openings which are viewable as an image from the front of the sheeting at a different selected range of angles different from the first-recited selected range of angles.

36. Directionally imaged sheeting comprising a transparent polymeric sheet which includes at least first and second layers; a monolayer of transparent microspheres embedded within the sheet intermediate the front and back surfaces of the sheet, with the front portions of the microspheres embedded in the first layer, the back portions of the microspheres covered by the second layer, and the back surface of the second layer being contoured so as to follow the curved back surfaces of the microspheres; and a thin specularly reflective layer of aluminum vapor-deposited on the contoured back surface of the polymeric sheet; the specularly reflective layer containing at least a first set of axial openings which are viewable as an image from the front of the sheeting within a selected range of angles.

37. Sheeting of claim 36 in which a colored marking material is applied to the transparent polymeric sheet through at least some of the axial openings.

38. Sheeting of claim 37 in which a second specularly reflective layer is coated over the first-recited specularly reflective layer and covers at least some of the axial openings.

39. Sheeting of claim 36 in which the specularly reflective layer contains at least one second set of axial openings which are viewable as an image from the front of the sheeting at a selected range of angles different from the first-recited selected range of angles.

40. Sheeting of claim 38 in which the first and second specularly reflective layers contain at least one second set of axial openings which are viewable from the front of the sheeting within a selected range of angles different from the first-recited selected range of angles.

41. Sheeting of claim 40 in which a first colored marking material is applied to the polymeric sheet through at least some of the first set of axial openings, and a second colored marking material is applied to the polymeric sheet through at least some of the second set of axial openings.

42. Method for preparing directionally imaged sheeting comprising: irradiating with laser radiation, within a limited angular range, a sheeting that includes a monolayer of transparent microlenses; a layer of transparent material covering at least the back surfaces of the microlenses; and a thin layer carried on the back surface of the layer of transparent material, so as to thereby form axial openings in the thin layer which are viewable as an image from the front of the sheeting within a selected range of angles.

43. Method of claim 42 in which a marking material is coated on the back surface of the layer of transparent material over at least some of the axial openings in the thin layer.

44. Method of claim 43 in which the marking material is impregnated into the layer of transparent material.

45. Method of claim 43 in which the marking material penetrates inside the openings in the thin layer and occupies an area larger than the openings.

* * * * *